United States Patent [19]

Sugawara

[11] Patent Number: 5,273,233
[45] Date of Patent: Dec. 28, 1993

[54] BAIL ARM REVERSING MECHANISM
[75] Inventor: Kenichi Sugawara, Sakai, Japan
[73] Assignee: Shimano, Inc., Osaka, Japan
[21] Appl. No.: 829,377
[22] Filed: Feb. 3, 1992
[30] Foreign Application Priority Data
  Feb. 4, 1991 [JP] Japan ............... 3-003646[U]
[51] Int. Cl.5 ............................. A01K 89/01
[52] U.S. Cl. .................... 242/232; 242/224
[58] Field of Search ........... 242/232, 233, 247, 248, 242/224

[56] References Cited
U.S. PATENT DOCUMENTS

| 3,796,391 | 3/1974 | McMickle | 242/233 |
| 4,676,450 | 6/1987 | Carpenter | 242/233 |
| 4,705,228 | 11/1987 | Maruyama | 242/233 |
| 4,824,040 | 4/1989 | Carpenter | 242/233 |
| 5,098,031 | 3/1992 | Hitomi | 242/233 |

FOREIGN PATENT DOCUMENTS 60-85162 6/1985 Japan.
62-80570 5/1987 Japan.

Primary Examiner—Daniel P. Stodola
Assistant Examiner—Eileen Dunn
Attorney, Agent, or Firm—Dickstein, Shapiro & Morin

[57] ABSTRACT

A reversing mechanism mounted in one bail support arm of a rotary frame for switching a bail arm between a line winding position and a line unwinding position. A toggle mechanism is mounted in an interior space of the support arm for urging the bail arm to the line winding position and line unwinding position. The toggle mechanism has a movable distal end linked to the bail arm. A kick arm extends through the support arm and has one end pivotally connected to an axis to be oscillatable therein. The kick arm has an intermediate position for contacting the movable distal end of the toggle mechanism to move the distal end to a position corresponding to the line winding position of the bail arm.

6 Claims, 5 Drawing Sheets

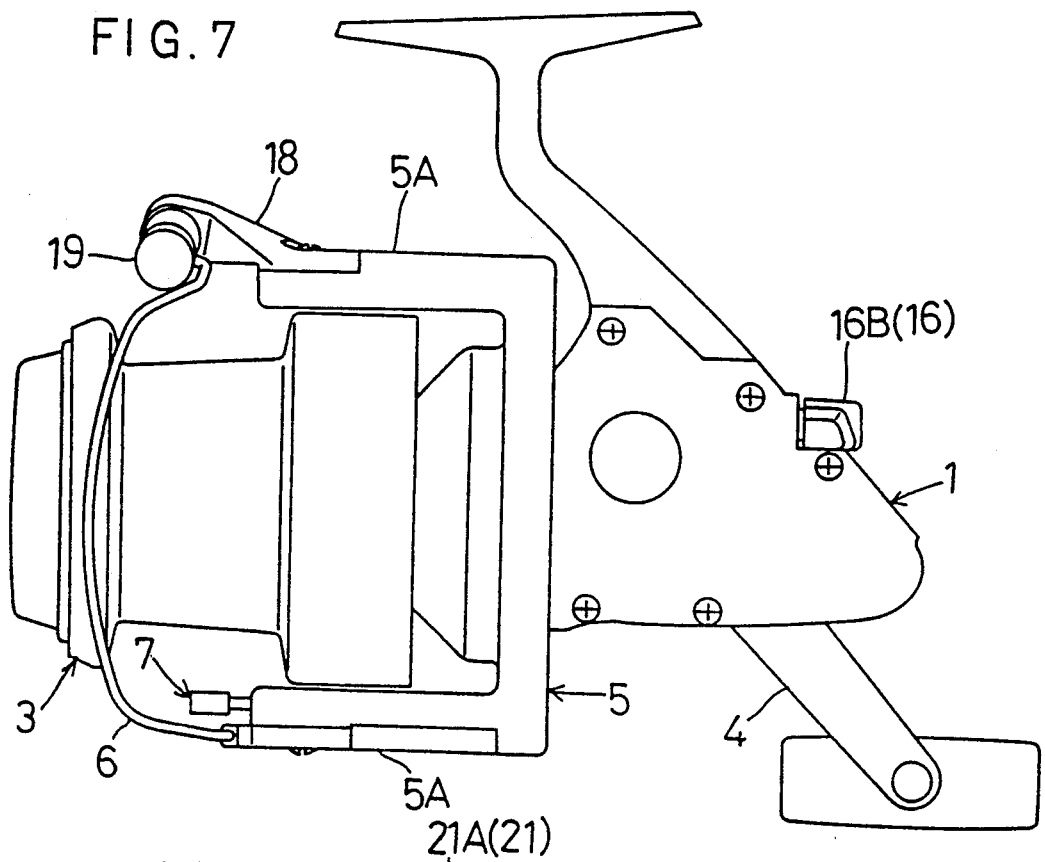
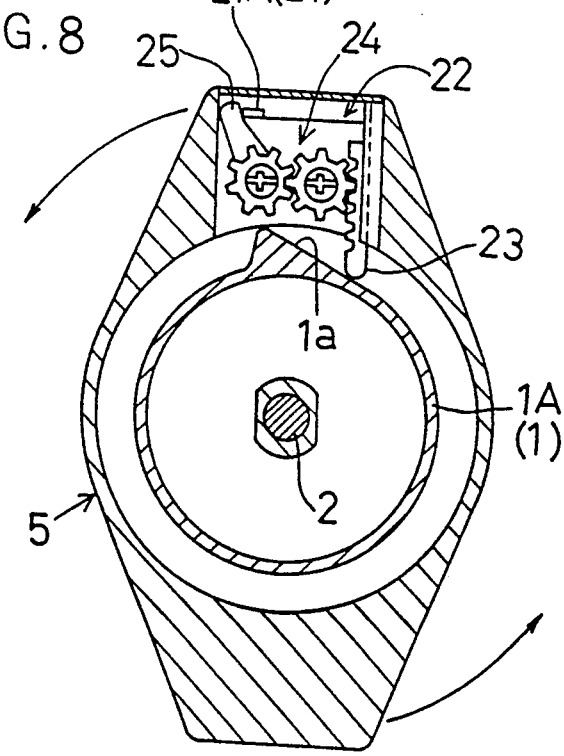

BAIL ARM REVERSING MECHANISM

BACKGROUND OF THE INVENTION

1. Field of the Invention

The present invention relates to a bail arm reversing mechanism, and more particularly to a bail arm reversing mechanism for a fishing reel having a bail arm extending between and supported by a pair of support arms formed on a rotary frame to be oscillatable between a line winding position and a line unwinding position, and a toggle mechanism mounted in a space defined in one of the support arms for urging the bail arm to the line winding position and to the line unwinding position, the toggle mechanism having a movable distal end linked to the bail arm.

2. Description of the Related Art

A bail arm reversing mechanism of this type has been proposed by Applicants in Japanese Utility Model Application No. 1990-80108. This prior reversing mechanism includes a toggle mechanism in the form of a seesaw arm oscillatable about a pivotal axis, and a compression spring connected to one end of the seesaw arm. This one end is a movable distal end linked to a bail arm. The other end of the seesaw arm projects from a bail supporting arm to be connected to a link mechanism engageable with a contact portion formed on a reel body when a rotary frame rotates in a line winding direction. Thus, with rotation of the rotary frame, the bail arm is returned with one end of the seesaw arm to a line winding position. As evident, a seesaw arm has a pivot at an intermediate portion thereof about which end portions of the arm, extending from either side of the pivot, may rock back and forth.

In the above construction in which the toggle mechanism is in the form of a seesaw arm having one end thereof linked to the bail arm and the other end defining a control portion engageable with the contact portion, an operating force is variable with a ratio between arm lengths from the pivotal axis to the opposite ends of the seesaw arm.

It is therefore possible to reduce the operating force by increasing the arm length from the pivotal axis to the other end. However, the arm length from the pivotal axis to the one end cannot be reduced greatly but must have a certain value since that end is linked to the bail arm and requires a sufficient moving stroke for switching the bail arm. This requires a certain arm length from the pivotal axis to the other end also, which results in the seesaw arm having a considerable length. It is difficult for such a toggle mechanism to be contained in a small interior space of the support arm of the rotary frame. After all, the length of the seesaw arm is determined to provide a great operating force. Since priority is given to the consideration of installation at the price of the arm length ratio, the bail arm is switched between the two positions with unsatisfactory smoothness.

SUMMARY OF THE INVENTION

The object of the present invention is to provide a bail arm reversing mechanism in which a toggle mechanism has an additional mechanism to smooth the bail arm switching action and also to be installed in a small space.

The above object is fulfilled, according to the present invention, by a bail arm reversing mechanism comprising a kick arm supported in one of support arms to be oscillatable about an axis and having a control portion in a distal end region thereof, the kick arm including an arm portion extending between the control portion and a proximal end connected to the axis and defining a force applying section for contacting a movable distal end of a toggle mechanism to move the movable distal end to a position corresponding to a line winding position of a bail arm, thereby switching the bail arm to the line winding position.

This construction has the following function and effect.

When the control portion of the kick arm is pushed to oscillate the kick arm, the force applying section of the arm portion of the kick arm applies a force to move the movable distal end of the toggle mechanism. The distal end then moves toward the position corresponding to the line winding position of the bail arm, thereby switching the bail arm to the line winding position.

Thus, by linking the movable distal end of the toggle mechanism to an appropriate position in the arm portion of the kick arm, it is sufficient to apply to the kick arm an operating force smaller than the operating force needed for application to the movable distal end of the toggle mechanism to switch the bail arm. In addition, the kick arm is free from any limitation as to its axis of oscillation, as distinct from the toggle mechanism which must be linked to the bail arm. Therefore, the kick arm may be mounted in a small space, with an arm length ratio just enough to provide a small operating force as required.

Other features and advantages of the present invention will be apparent from the following description.

BRIEF DESCRIPTION OF THE DRAWINGS

FIG. 7 is a side view of the spinning reel, and FIG. 8 is a view similar to FIG. 3 and showing a modified mechanism.

DETAILED DESCRIPTION OF THE PREFERRED EMBODIMENT

An embodiment of the present invention will be described in detail hereinafter with reference to the drawings.

Figure 6:
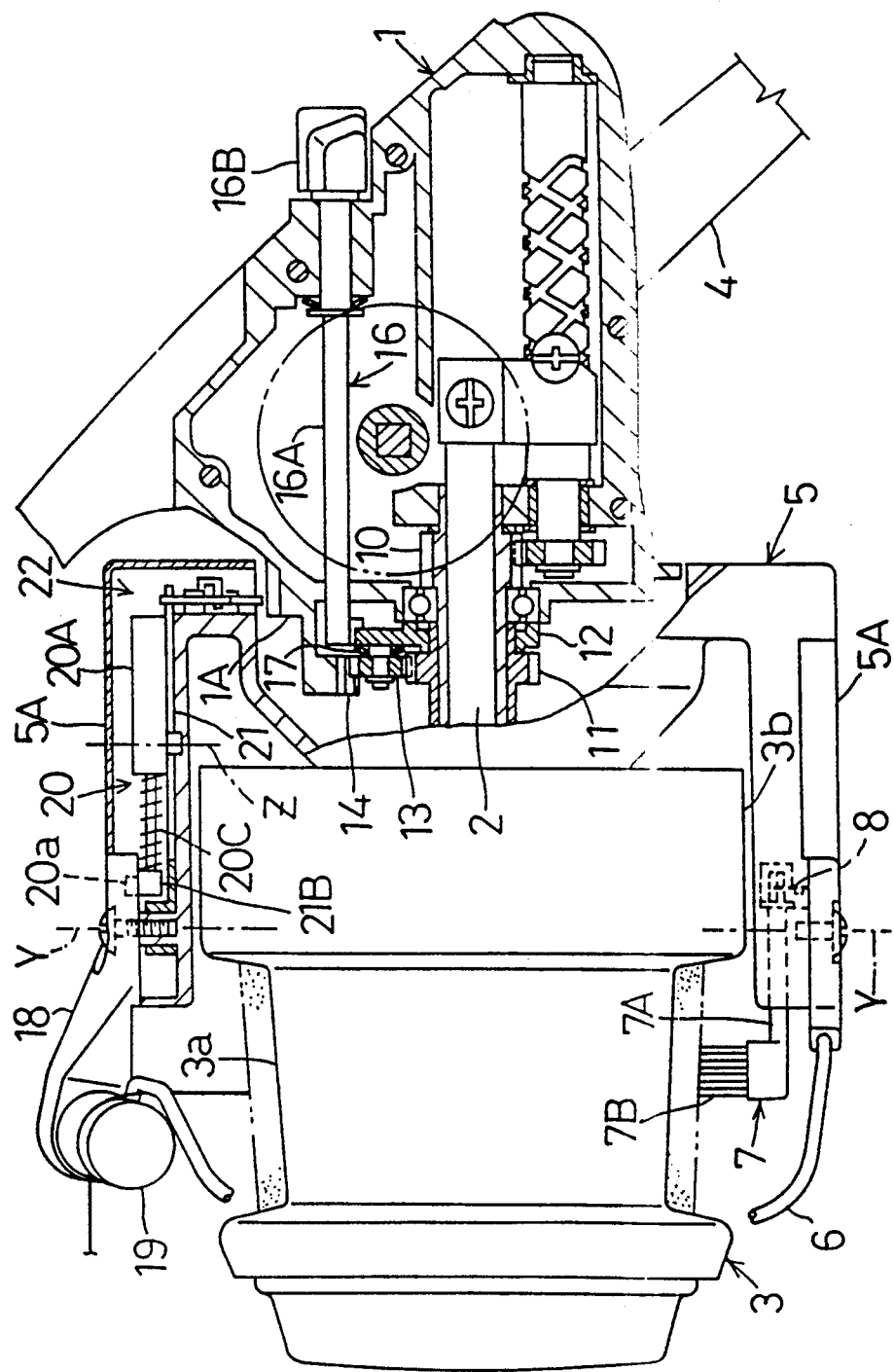
FIG. 6 is a side view, partly in section, showing a spinning reel.

FIGS. 6 and 7 show a spinning reel including a main body 1 having a spool shaft 2 extending forwardly therefrom. A spool 3 is mounted on a forward portion of the spool shaft 2. A rotary frame 5 rotatable on the spool shaft 2 by turning a handle 4 includes a pair of support arms 5A with a bail arm 6 attached thereto. This bail arm 6 is oscillatable between a line winding position and a line unwinding position.

Figure 4:
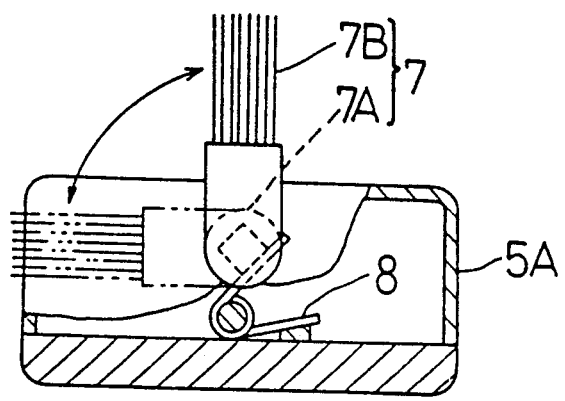
FIG. 4 is a front view in vertical section showing a line presser, FIGS. 5 (a) through (c) are explanatory views illustrating functions of a stopper mechanism for stopping rotation of a rotary frame.

A line presser 7 will be described next with reference to FIGS. 4 and 6. The line presser 7 is provided to press a fishing line wound on a line holding portion 3a of the spool 3, in order to prevent the fishing line from becoming loose and falling off over a rear wall (skirt portion) 3b of the spool 3. The line presser 7 includes a support rod 7A connected to one of the support arms 5A of the rotary frame 5, and a brush 7B attached to a distal end of the support rod 7A for pressing on the fishing line. The support rod 7A is oscillatable about an axis of the support rod 7A by a toggle spring 8. Thus, the brush 7B is manually switchable between a line pressing position and a retracted position.

Figure 5:
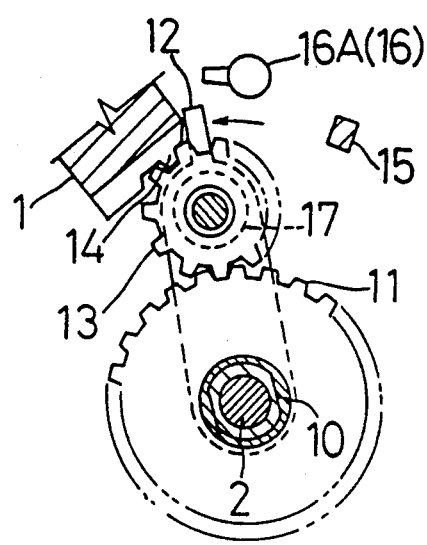
Figure 5:
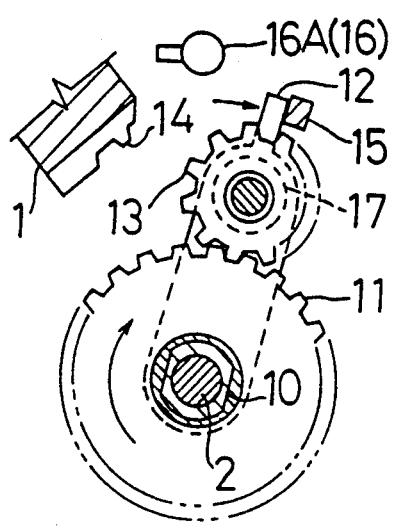
Figure 5:
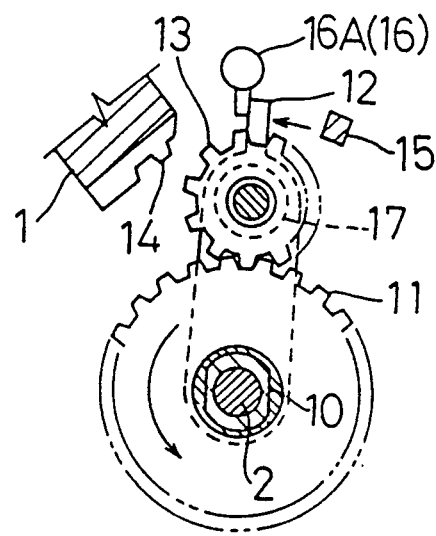

The rotary frame 5 includes a stopper mechanism as shown in FIGS. 5 and 6. The spool shaft 2 carries a pinion gear 10 relatively rotatably mounted thereon to form part of a transmission line for driving the rotary frame 5. An interlocking gear 11 is mounted on a boss of the pinion gear 10 to be rotatable therewith. A plate-like rotatable member 12 is relatively rotatably mounted on a boss of the interlocking gear 11. A relay gear 13 is rotatably supported at one end of the rotatable member 12 and meshed with the interlocking gear 11.

The main body 1 defines a stopper gear 14 in the form of a partial gear on an inner peripheral wall thereof. As shown in FIG. 5(a), when the relay gear 13 oscillates with the rotatable member 12 about an axis of the spool shaft 2 and engages the stopper gear 14, the interlocking gear 11 is stopped, thereby stopping rotation of the rotary frame 5. A disk spring type frictional retaining mechanism 17 is provided between the relay gear 13 and rotatable member 12, which causes the relay gear 13 to rotate with the rotatable member 12 instead of rotating relative to the interlocking gear 11 when the interlocking gear 11 rotates with the rotary frame 5. When a force exceeding a frictional retaining force of the frictional retaining mechanism 17 is applied, the relay gear 13 rotates relative to the rotatable member 12.

The main body 1 further includes a stopper piece 15 projecting from the inner peripheral wall thereof and opposed to the stopper gear 14 for contacting and limiting rotation of the rotatable member 12. A manual stopper mechanism 16 is provided between the stopper piece 15 and stopper gear 14 for contacting and stopping rotation in one direction of the rotatable member 12. The manual stopper mechanism 15 includes a stopper rod 16A switchable between an operative position for contacting the rotatable member 12 and a retracted position for allowing rotation of the rotatable member 12, and a manual control element 16B for maintaining the stopper rod 16A in the retracted position and allowing the stopper rod 16A to switch to the operative position.

When the stopper rod 16A contacts the rotatable member 12 as shown in FIG. 5(c), the relay gear 13 rotates against the frictional retaining force, and the rotary frame 5 becomes freely rotatable in a line unwinding direction. When the stopper piece 15 contacts the rotatable member 12 as shown in FIG. 5(b), the relay gear 13 rotates against the frictional retaining force, and the rotary frame 5 becomes freely rotatable in a line winding direction. That is, the rotary frame 5 becomes rotatable forward. Conversely, when the stopper rod 16A is maintained in the retracted position as shown in FIG. 5(a), the stopper gear 14 engages the relay gear 13 whereby the rotary frame 5 becomes unrotatable in the line unwinding direction. When, in this state, the handle 4 is turned in the line winding direction, the rotatable member 12 contacts the stopper piece 15 and the relay gear 13 and interlocking gear 11 rotate to allow rotation of the rotary frame 5 only in the line winding direction. The frictional retaining mechanism 17 may be disposed between the interlocking gear 11 and rotatable member 12. The stopper gear 14 may be provided as a separate element to be attached to the inner wall of the main body 1.

Figure 2:
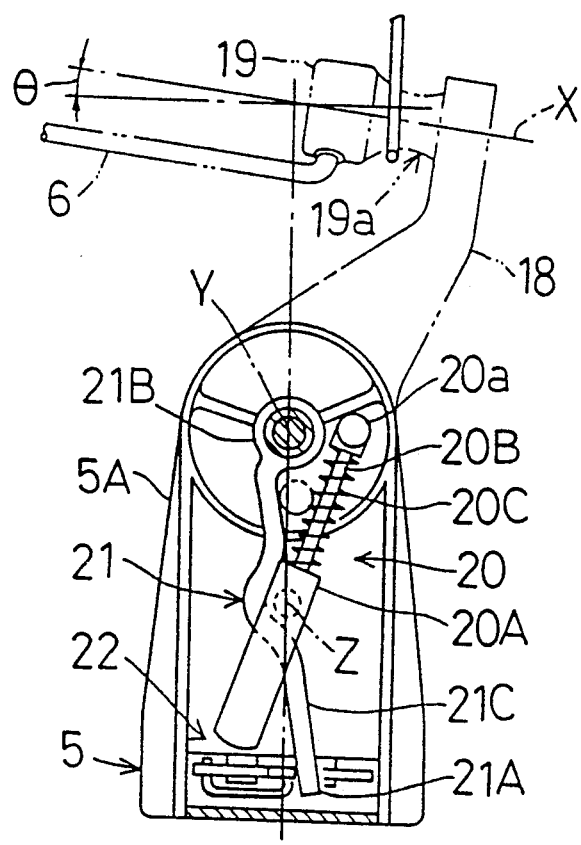
FIG. 2 is a plan view showing the interior structure of the support arm with the bail arm in a line winding position.

As shown in FIG. 2, one end of the bail arm 6 is connected to a line guide arm roller 19 attached to an arm 18 oscillatably attached to one of the support arms 5A of the rotary frame 5. The arm roller 19 has a rotational axis X inclined at an angle $\theta$ to a line takeup direction of the fishing line to be wound on the spool 3. Consequently, the arm roller 19 defines an illustrated sloping surface 19a having an increased angle of inclination to provide an increased resistance to movement of the fishing line toward the arm 18, thereby producing a position restricting effect to avoid twining of the fishing line.

Figure 1:
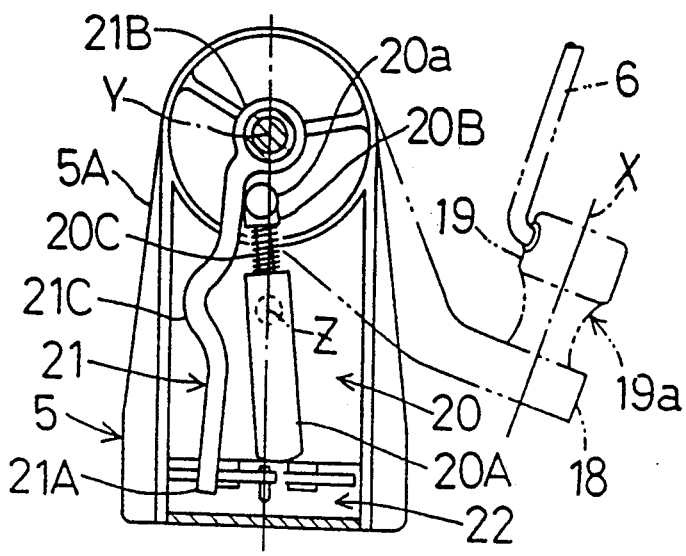
FIG. 1 is a plan view showing an interior structure of a support arm with a bail arm in a line unwinding position.
Figure 3:
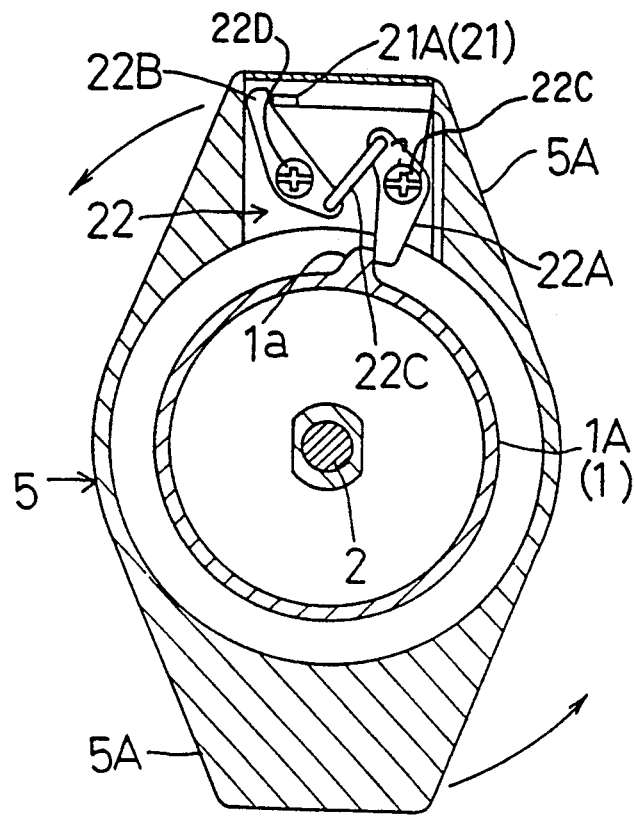
FIG. 3 is a front view in vertical section showing an link mechanism for acting on a kick arm.

A switching structure for switching positions of the bail arm 6 will be described next. As shown in FIGS. 1 through 3, the arm 18 is connected to one of the support arms 5A of the rotary frame 5 to be oscillatable about an axis Y. This support arm 5A contains a toggle mechanism 20 in an interior space thereof for urging the bail arm 6 to the line winding position and line unwinding position. The toggle mechanism 20 includes a holder 20A oscillatable about a pivotal axis Z, a slide rod 20B slidable relative to the holder 20A, an urging spring 20C mounted between the holder 20A and slide rod 20B, and a pin 20a fixed to a distal end of the slide rod 20B and engaged with an inner wall of the arm 18. Though not shown, a stopper is defined by a stopper pin projecting from the inner wall of the arm 18 and an inner wall of the support arm 5A for setting the bail arm 6 to the line winding position and line unwinding position.

A kick arm 21 is oscillatably mounted on the axis Y of the arm 18 and retained in place by the arm 18 for operating the toggle mechanism 20. The kick arm 21 has a distal end projecting from the interior space of the support arm 5A, and this projecting distal end acts as a control portion 21A of the kick arm 21. An arm portion 21C extends from the control portion 21A to a proximal end 21B connected to the axis Y. This arm portion 21C includes a contact part for moving the pin 20a of the toggle mechanism 20 to a position corresponding to the line winding position of the bail arm 6. That is, the kick arm 21 is oscillatable to contact the pin 20a and move it around axis Y. When the pin 20a moves beyond a dead point, the pin 20a switches the arm 18 and bail arm 6 to the line winding position under the force of the urging spring 20C.

As shown in FIG. 3, a link mechanism 22 is provided adjacent the control portion 21 of the kick arm 21 for contacting the control portion 21 to oscillate the kick arm 21. The main body 1 includes a forward end boss 1A defining a drive projection 1a on an outer wall thereof. With rotation of the rotary frame 5, this projection 1a contacts the link mechanism 22. Thus, the link mechanism 22 is driven with rotation of the rotary frame 5, to oscillate the kick arm 21 for switching the bail arm 6 to the line winding position.

The link mechanism 22 includes two seesaw arms 22A and 22B arranged side by side on a rear surface of the support arm 5A and interconnected through a connecting rod 22C. Each seesaw arm 22A, 22B is capable of rocking back and forth about pivot axis 22C, 22D located at an intermediate portion thereof. In FIG. 3, the left seesaw arm 22B is positioned so that one end thereof contacts the control portion 21A of the kick arm 21.

According to the above construction in which the arm portion 21C of the kick arm 21 is movable into contact with the pin 20a which corresponds to the distal end of the toggle mechanism 20, an operating force needed to switch the bail arm 6 is reduced by an amount corresponding to a ratio between an arm length from the axis Y to the point of contact with the toggle mechanism 20 and an arm length from the axis Y to the control portion 21A.

The described embodiment may be modified as follows:

(1) The toggle mechanism 20 may comprise simply a compression spring or a torsion spring.

(2) A point of connection to the bail arm 6 and a point of contact with the kick arm 21 may be disposed adjacent to each other at the distal end 20a of the toggle mechanism 20.

(3) The kick arm 21 and the arm 18 supporting the bail arm 6 may have different axes of oscillation.

(4) As shown in FIG. 8, the link mechanism 22 may include a vertically movable rack 23 engageable and raisable by a drive projection 1a, and gearing 24 to oscillate an activating arm 25 for driving the kick arm 21.

(5) Where a large oscillating range is allowed for the kick arm 21, the pin 20a may be rigidly connected to the contact part of the kick arm portion 21C.

What is claimed is:

1. A bail arm reversing mechanism comprising:
a rotary frame;
a bail arm extending between a pair of support arms to be pivotable between a line winding position and a line unwinding position;
a toggle mechanism mounted in an interior space of one of said support arms for urging said bail arm to said line winding position and said line unwinding position, said toggle mechanism having a movable distal end linked to said bail arm; and
a kick arm supported to one of said support arms to be pivotable about an axis and having a control portion in a distal end region thereof;
said kick arm including an arm portion extending between said control portion and a proximal end thereof which is pivotal about an axis and defines a force applying section for contacting said movable distal end of said toggle mechanism to move said movable distal end to a position corresponding to said line winding position, thereby switching said bail arm to said line winding position.

2. A bail arm reversing mechanism as claimed in claim 1, wherein said toggle mechanism includes a holder pivotable about an axis, a slide rod slidable relative to said holder, an urging spring mounted between said holder and said slide rod, and said movable distal end.

3. A bail arm reversing mechanism as claimed in claim 2, wherein said movable distal end has an upper end engaged with an inner wall of an arm of said rotary frame.

4. A bail arm reversing mechanism as claimed in claim 3, further comprising a link mechanism disposed adjacent said control portion of said kick arm for contacting said control portion and pivoting said kick arm, and a main body including a forward end boss defining a drive projection on an outer wall thereof for contacting said link mechanism with rotation of said rotary frame, said link mechanism being driven with rotation of said rotary frame to pivot said kick arm for switching said bail arm to said line winding position.

5. A bail arm mechanism as claimed in claim 4, wherein said link mechanism comprises two seesaw arms arranged said by side on a rear surface of said one of said support arms, each of said seesaw arms having a pivot axis at an intermediate portion thereof about which it pivots, and said link mechanism further comprises a connecting rod interconnecting said seesaw arms, one of said seesaw arms having one end thereof movable into contact with said control portion of said kick arm.

6. A bail arm reversing mechanism as claimed in claim 4, wherein said link mechanism includes a vertically movable rack engageable with said drive projection, to pivot an actuating arm through gearing for driving said kick arm.

* * * * *